Dec. 22, 1959     D. G. HAGADONE     2,918,339

FLUID SEAL

Filed Jan. 28, 1958

INVENTOR.
DONALD G. HAGADONE
BY
ATTORNEY

United States Patent Office 2,918,339
Patented Dec. 22, 1959

2,918,339

FLUID SEAL

Donald G. Hagadone, Galesburg, Mich., assignor to Cleveland Pneumatic Industries, Inc., Cleveland, Ohio, a corporation of Ohio Application January 28, 1958, Serial No. 711,579

6 Claims. (Cl. 309—23)

This invention relates to fluid seals and more particularly to a fluid seal suitable for use at elevated temperatures, and the method of making the seal gland.

It is an important object of this invention to provide a seal assembly incorporating a gland formed of a cord of asbestos covered wire coiled and compressed to form an annular gland suitable for use in high temperature seal installations.

It is another important object of this invention to provide a method of making a new and improved high temperature seal.

Further objects and advantages will appear from the following description and drawings wherein.

Figure 1:
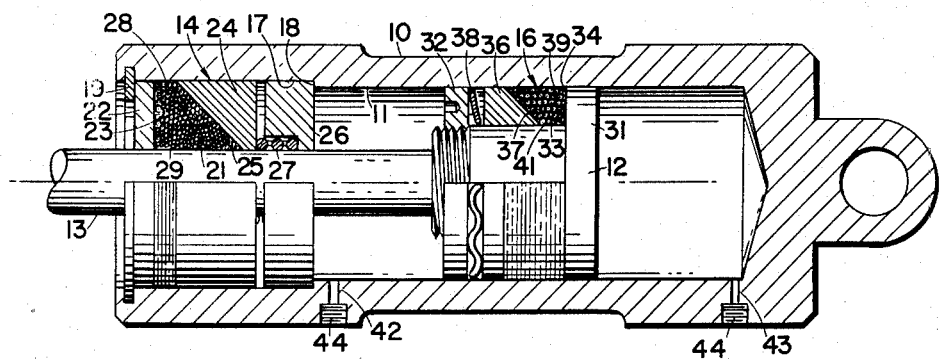
Figure 1 is a side elevation partially in longitudinal section showing an actuator incorporating two embodiments of the seal according to this invention.
Figure 2:
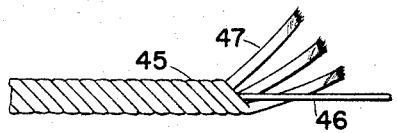
Figure 2 is an enlarged fragmentary view of the cord used to form the sealing gland.
Figure 3:
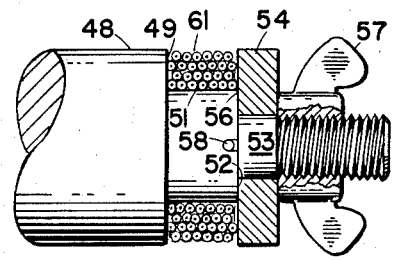
Figure 3 is a side elevation and longitudinal section of the winding spindle on which the cord is initially coiled.
Figures 4, 5:
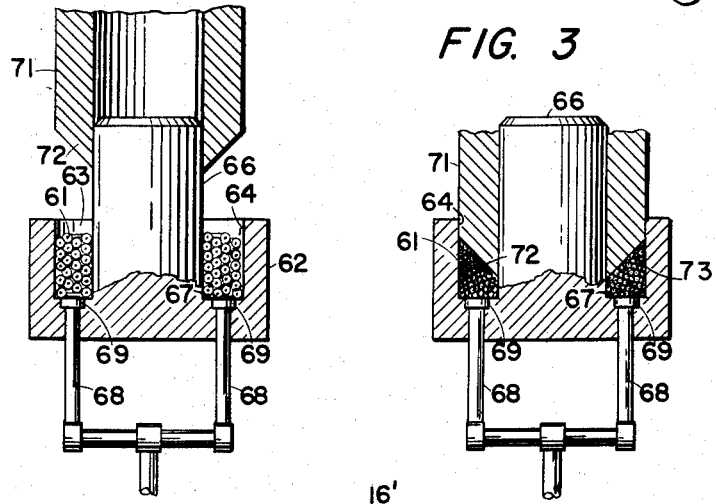
Figure 4 is a longitudinal section of the compression or forming die showing the loose coil used to form the gland before compression thereof.
Figure 5 is a view similar to Figure 4 showing the gland element as compressed in the forming die.

At normal operating temperatures, rubber fluid seals such as O-rings and the like have been highly successful, however, the inability of elastomeric materials in withstanding high temperatures has prevented their use as fluid seals for high temperature installations, particularly where the seal must be dynamic rather than static. A seal according to this invention utilizes a gland formed of a material which is virtually unaffected by elevated temperatures in the order of 1000° F. and above. To form the gland element, I utilize a flexible cord formed of asbestos covered soft wire. Those skilled in the art will recognize that asbestos is immune to high temperatures and that metallic wire is also able to withstand elevated temperatures. Past attempts to use asbestos glands have generally been found unsatisfactory because the asbestos tends to flake or crumble and cause the gland to deteriorate rapidly. By utilizing the gland according to this invention, actual tests have indicated that the seal will have a long service life during which time it will provide superior sealing.

Referring to the drawings, a seal according to this invention is shown in two different embodiments as it could be installed in a fluid motor of the piston and cylinder type. The fluid motor includes a cylinder 10 formed with an internal cylinder bore 11 open at the left end of the cylinder. A piston 12 is axially movable in the bore 11 and is provided with a piston rod 13 projecting out of the left end of the cylinder to which a load can be connected. A first sealing assembly 14 extends between the cylinder 10 and the piston rod 13 and is axially fixed relative to the cylinder, and a second sealing assembly 16 extends between the piston 12 and the cylinder 10 and is axially fixed to the piston 12. Although the two sealing assemblies 14 and 16 are very similar and are identical in functional operation, they differ slightly in structure and will be discussed separately.

The sealing assembly 14 is positioned within a counterbore 17 formed in the cylinder 10, and is seated against a shoulder 18 joining the counter-bore 17 and the cylinder bore 11. A snap ring 19 may be positioned on the outer side of the sealing assembly 14 to secure the sealing assembly 14 in position. The sealing assembly includes a gland 21 which provides the fluid sealing engagement with the cylinder 10 and the piston rod 13, an outer plate 22 having a radial surface 23 engaging the gland 21, an inner plate 24 having a conical surface 25 engaging the opposite side of the gland 21, a spring plate 26 engaging the shoulder 18, and a coil spring 27 resiliently extending between the spring plate 26 and the inner plate 24 resiliently urging the inner and outer plates 22 and 24 toward each other, thereby compressing the gland 21. The gland 21 has an outer cylindrical face 28 which engages the surface of the counter-bore 17, and an inner cylindrical face 29 which engages the surface of the piston rod 13. Because the gland 21 has a conical end face engaged by the conical end face 25 of the inner plate 24, one of the inner or outer faces is longer than the other. Because the sealing assembly is axially fixed relative to the cylinder and must provide a dynamic seal with the piston rod 13, it is preferable to arrange this gland so that the long sealing face is the one engaging the piston rod 13 so that the dynamic seal will have a larger surface of engagement. Therefore, the cone of the inner plate 24 is arranged to be concave.

The spring 27 functions to compress the inner plate 24 against the gland 21 and provide the initial engagement between the gland and the piston rod 13. Those skilled in the art will recognize that as the pressure builds up within the cylinder bore 11, this pressure will augment the force of the spring 27 and urge the inner plate 24 against the gland 21 with a force which is a function of the pressure being sealed. Therefore, the inner plate 24 will always maintain a compression force on the gland 21, which is greater than the pressure of the fluid being sealed by an amount created by the spring force. Again the conical surface 25 of the inner plate 24 produces a radial compression of the gland 21, urging it into engagement with the piston rod 13 to provide an adequate dynamic seal.

The second sealing assembly 16 is positioned between a radial shoulder 31 formed on the piston 12, and a nut 32 threaded on to the piston 12 on the side of the sealing assembly 16 opposite the shoulder 31. Here again a conical type gland 33 is positioned on one side against a radial wall 34 of the shoulder 31, and is compressed on the other side by a plate 36 formed with a conical surface 37. In this case I utilize a wave washer type spring 38 between the nut 32 and the plate 36 to resiliently urge the plate 36 toward the shoulder 31 and compress the gland 33. In this particular sealing assembly the dynamic seal is external and the static seal is internal, so the gland 33 is formed with a cylindrical outer face 39 which is longer than its inner cylindrical face 41. Here again the conical surface 37 resiliently compresses the gland 33 to insure that the outer face 39 is always in engagement with the cylinder bore 11.

To complete the fluid motor, it is necessary to provide a first fluid port 42 at the left end of the cylinder 10 and a second fluid port 43 at the right end of the cylinder 10. The two ports 42 and 43 open into threaded bores 44 to which suitable pressure lines can be connected. If pressure fluid is supplied to the first port 42 and the second port 43 is connected to an exhaust, the piston 12 will move to the right, and conversely, if the pressure connections are reversed, the cylinder 12 will move to the left.

Reference should now be made to Figures 2 through 5 for a clear understanding of the structure of the gland used in the two sealing assemblies 14 and 16. The gland is formed of a cord, shown in the enlarged view of Figure 2, which comprises a wire 46 around which is wound in the form of a helix a plurality of asbestos yarn filaments 47. In the illustrated case there are three filaments of yarn wound around wire 46, however, the number of filaments utilized to form a cord is not critical and may be varied so long as the filaments form a shield completely along the wire 46. To form the gland, I first form a loose coil of the cord shown in Figure 2, and for this purpose I utilize a jig shown in Figure 3. The jig includes a rotatable spindle 48 having a radial shoulder 49 from which extends a cylinder portion 51. The cylinder portion 51 terminates in a shoulder 52 from which extends a threaded shank 53. Positioned on the shank 53 against the shoulder 52 is a removable retainer 54, which has a radial wall 56 which cooperates with the cylinder portion 51 and the shoulder 49 to form a cylindrical groove adapted to receive the cord 45. To secure the retainer 54 in position against the shoulder 49, I utilize a wing nut 57 threaded on to the shank 53. The cylinder portion 51 is also formed with an axially extending notch 58 which extends to the shoulder 52, and provides a recess into which the end of the cord 45 is inserted at the beginning of the winding operation. The spindle 48 is then rotated, causing the cord 45 to be wound therearound until the cylindrical groove between the wall 56 and shoulder 49 is completely filled with a coil of cord 61. After the coil is formed, the wing nut 57 and the retainer 54 are removed and the coil 61 is slipped over the end of the spindle 48. The loose coil is then placed within a confining die 62 shown in Figure 4. The confining die is formed with an annular recess 63 having an inner cylindrical wall 64 of the same diameter as the desired outer face of the finished gland, and a centrally located axially extending stem 66 having a diameter equal to the desired inner diameter of the finished gland. The end of the recess 63 is formed by a radial wall 67 in which are positioned knock-out pins 68, the ends of which are flush with the surface of the wall. The ends of the knock-out pins 68 are formed with head portions 69 which fit into the recess 63 formed with the radial wall 66, so they are retained in their proper position during compression of the coil. To compress the coil 61, I provide a tubular ram 71 which closely fits in the recess 63 and is formed with a conical end surface 72. To compress the coil 61 any suitable means, such as a hydraulic press, are used to move the ram 71 down into the confining die 62 until the elements assume the position in Figure 5, at which time a gland 73 is formed. To remove the gland 73, it is merely necessary to remove the ram 71 and push the glands out of the confining die 62 with the knock-out pins 68.

Those skilled in the art will recognize that the soft asbestos filaments 47, when reinforced by the wires 46, will form a tight gland which holds its shape due to the presence of the wires 46. However, because the wire 46 is small in diameter and relatively soft, the gland provides sufficient flexibility to maintain proper sealing engagement. In addition, the operation of the conical end plates is resiliently urged toward the gland to compensate for any wear which might occur. Because the materials used to form the entire sealing assemblies and, particularly, because the glands are capable of withstanding elevated temperatures, the resulting seal is suitable for use in high temperature applications.

Figure 6:
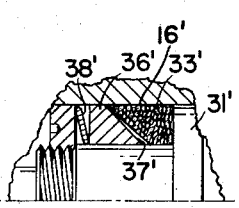
Figure 6 is a fragmentary view illustrating a second embodiment of the seal assembly.

In Figure 6 a modification of the piston head seal assembly is shown wherein a lighter spring can be used while still maintaining sealing engagement. In this figure similar numerals will be used with a prime (') added to indicate that they refer to the second embodiment. The assembly 16' includes the shoulder 31' against which the gland 33' is seated by the plate 36' and spring 38'. In this embodiment the conical surface 37' of the plate 36' is formed with a face angle which is greater than the face angle of the cone end of the gland 33' so that the two cone faces only engage adjacent to the outer dynamic sealing surface. Therefore a given spring force will produce a greater pressure in the gland at the dynamic sealing area and permit the use of a lighter spring in a given installation.

Although the preferred embodiments of this invention are illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed descriptions are determinative of the scope of the invention.

I claim:

1. A seal assembly comprising a gland formed of a cord of asbestos covered wire coiled and compressed to form a gland with the coils thereof mounted in annular relationship, said gland forming a cylindrical body having inner and outer cylindrical faces, a first plate having a wall engaging one side of said gland, a second plate having a wall engaging the other side of said gland, and resilient means connected to said plates resiliently urging them toward each other thereby compressing said gland to increase the diameter of said outer cylindrical face and to reduce the diameter of said inner cylindrical face.

2. A seal assembly comprising a gland formed of a cord of asbestos covered wire coiled and compressed to form a gland with the coils thereof mounted in annular relationship, said gland forming a cylindrical body having inner and outer cylindrical faces, a first plate having a radial wall engaging one side of said gland, a second plate having a conical wall engaging the other side of said gland, and resilient means connected to said plates resiliently urging them toward each other thereby axially compressing said gland to increase the diameter of said outer cylindrical face and to reduce the diameter of said inner cylindrical face.

3. In a device of the character described, a pair of relatively movable concentric members having opposed inner and outer cylindrical surfaces, a gland formed of a cord of asbestos covered wire coiled and compressed to form a gland with the coils thereof mounted in annular relationship, said gland forming a cylindrical body having inner and outer cylindrical faces in sealing engagement with said outer and inner surfaces respectively, and shoulder means carried by said one member axially compressing said gland and thereby effect said sealing engagement.

4. In a device of the character described, a pair of relatively movable concentric members having opposed inner and outer cylindrical surfaces, a seal assembly secured on one of said members including a gland formed of a cord of asbestos covered wire coiled and compressed to form an annular gland, said gland having inner and outer cylindrical faces in sealing engagement with said outer and inner surfaces respectively, a first plate having a wall engaging one side of said gland, a second plate having a wall engaging the other side of said gland, the face of said gland engaging the other of said members being longer than the face engaging said one member, and resilient means operably connected to said plates resiliently urging them toward each other.

5. In a device of the character described, a pair of relatively movable concentric members having opposed inner and outer cylindrical surfaces, a seal assembly secured on one of said members including a gland formed of a continuous cord of asbestos covered wire coiled and compressed to form an annular gland, said gland having inner and outer cylindrical faces in sealing engagement with said outer and inner surfaces respectively, a first plate having a radial wall engaging one side of said gland, a second plate having a conical wall engaging the other side of said gland, the face of said gland engaging the other of said members being longer than the face engaging said one member, and resilient means operably connected to said plates resiliently urging them toward each other.

6. In any device of the character described, a pair of relatively movable concentric members having opposed inner and outer cylindrical surfaces, a seal assembly secured on one of said members including a gland formed of a continuous cord of asbestos covered wire coiled and compressed to form an annular gland, said gland having inner and outer cylindrical faces in sealing engagement with said outer and inner surfaces respectively, a first plate having a radial wall engaging one side of said gland, a second plate having a conical wall engaging the other side of said gland, only adjacent to said other member the face of said gland engaging the other of said members being longer than the face engaging said one member, and resilient means operably connected to said plates resiliently urging them toward each other.

References Cited in the file of this patent

UNITED STATES PATENTS

| | | |
|---|---|---|
| 919,845 | Gautsche | Apr. 27, 1909 |
| 2,188,957 | Pfauser | Feb. 6, 1940 |
| 2,587,945 | Wirth | Mar. 4, 1952 |
| 2,724,671 | Lombardy | Nov. 22, 1955 |